United States Patent
Liu et al.

(10) Patent No.: US 7,209,467 B2
(45) Date of Patent: Apr. 24, 2007

(54) ADAPTIVE ADJUSTMENT OF BACKOFF TIMES IN WIRELESS NETWORK COMMUNICATIONS

(75) Inventors: Yonghe Liu, Dallas, TX (US); Matthew B. Shoemake, Allen, TX (US); Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 877 days.

(21) Appl. No.: 10/304,973

(22) Filed: Nov. 26, 2002

(65) Prior Publication Data

US 2004/0100936 A1    May 27, 2004

(51) Int. Cl.
*H04Q 7/24* (2006.01)
*H04J 3/00* (2006.01)
*H04B 7/212* (2006.01)
*H04L 12/413* (2006.01)

(52) U.S. Cl. .............. 370/338; 370/345; 370/348; 370/445

(58) Field of Classification Search .............. None
See application file for complete search history.

(56) References Cited

U.S. PATENT DOCUMENTS

| | | | |
|---|---|---|---|
| 4,063,220 A | | 12/1977 | Metcalfe et al. |
| 4,332,027 A | | 5/1982 | Malcolm et al. |
| 5,319,641 A | | 6/1994 | Fridrich et al. |
| 5,699,515 A | * | 12/1997 | Berkema et al. ......... 370/448 |
| 6,215,792 B1 | * | 4/2001 | Abi-Nassif ............. 370/458 |
| 6,353,617 B1 | * | 3/2002 | Cadd et al. ............ 370/445 |
| 7,027,462 B2 | * | 4/2006 | Benveniste ............. 370/447 |
| 2002/0154653 A1 | | 10/2002 | Mathilde |

OTHER PUBLICATIONS

Bruno, R., et al.; A Simple Protocol for the Dynamic tuning of the Backoff Mechanism in IEEE 802.11 Networks, Computer Networks, Elsevier Science Publishers B.V. Amsterdam, NL, vol. 37, No. 1, Sep. 2001, pp. 33-44.

Grilo, A., et al.; Performance Evaluation of IEEE 802.11E, INES/IST, vol. 1, Sep. 15, 2002, pp. 511-517.

Bianchi, G., et al.; Performance Evaluation and Enhancement of the CSMA/CA MAC Protocol for 802.11 Wireless LANs, Personal, Indoor and Mobile Radio Communications, 1996, PIMRC '96, Seventh IEEE Int'l Symposium on Taipei, Taiwan Oct. 15-18, 1996, New York, NY, USA, IEEE, US, Oct. 15, 1996, pp. 392-396.

\* cited by examiner

*Primary Examiner*—Chirag G. Shah
(74) *Attorney, Agent, or Firm*—Steven A. Shaw; W. James Brady; Frederick J. Telecky, Jr.

(57) ABSTRACT

A wireless network, including a plurality of network elements such as a wireless access point (9), and computer stations (2, 4, 6), is disclosed. The wireless network operates so that each network element (2, 4, 6, 9) waits for a pseudo-randomly selected duration, after the end of a frame on the channel, before initiating transmission. One of the network elements, such as the wireless access point (9), measures the performance of the network over a measurement period (T), and adjusts a minimum value of the upper limit of the range from which the random duration is selected, according to the performance of the network over the measurement period. The times measured may be the successful transmission time ($T_s$), which is maximized in adjusting the minimum value, or the idle and collision times ($T_1$, $T_c$), which are equated in the optimization of the minimum value.

13 Claims, 5 Drawing Sheets

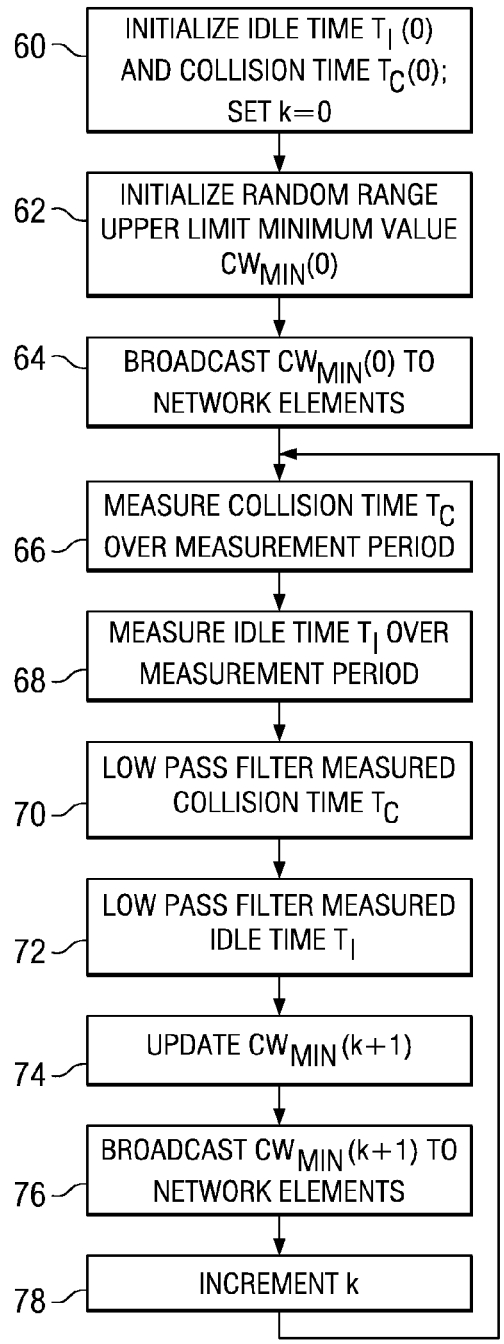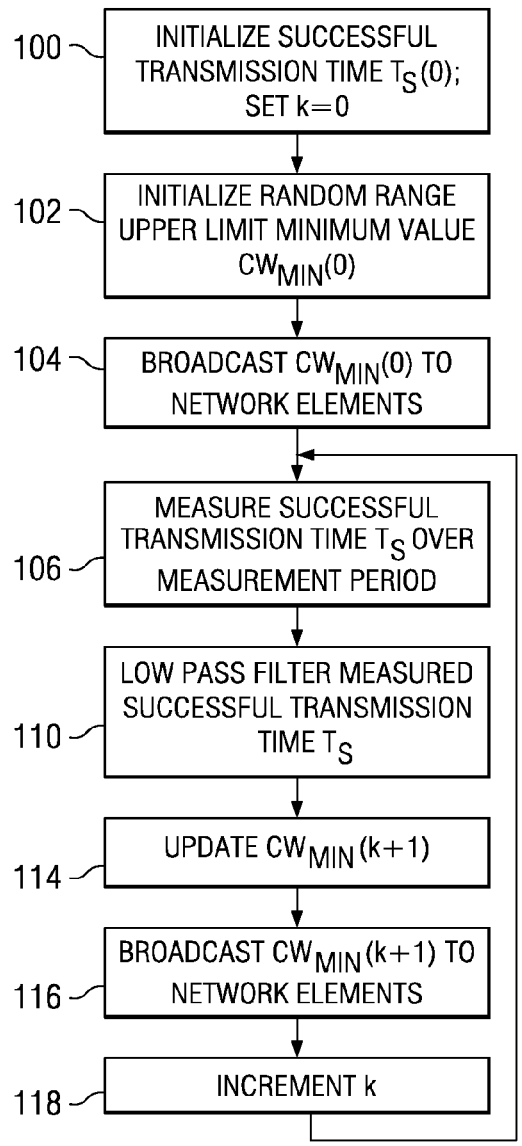

ADAPTIVE ADJUSTMENT OF BACKOFF TIMES IN WIRELESS NETWORK COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of wireless computer networks, and is more specifically directed to the optimization of data transmissions in wireless networks.

In recent years, the networking of multiple computers has become widespread, not only in business environments but also in the home. While many of these Local Area Networks (LANs) are "wired" networks, such as Ethernet networks, wireless networks have recently become quite popular, in large part because of recent reductions in the cost of wireless network equipment. An attractive benefit of wireless networks is the ease of installation, because cabling need not be run in order to set up a network. In addition, portable computing devices, such as laptop personal computers, become truly portable when communicating over wireless networks. Indeed, many businesses such as coffee shops, airports, convention centers, and hotels are now deploying wireless networks at their locations, to provide Internet and email service to their visiting customers. Many schools are now also deploying wireless LANs in the classroom, permitting students with laptop computers and wireless network adapters to download and upload assignments, class notes, and the like, and to communicate with the instructor and with other students.

Communications standards have been an important factor in the widespread deployment of wireless networks. Current wireless networking standards include the 802.11b and 802.11a standards, both promulgated under the auspices of the Institute of Electrical and Electronics Engineers, Inc. (IEEE). Many computing and networking devices now operate according to these standards, permitting widespread use of this technology. By way of further background, the wireless networking industry is now working toward a new, higher data rate, wireless LAN standard, commonly referred to as 802.11 g. Under this standard, it is expected that high data rates, up to and perhaps exceeding the 802.11a data rate of 54 Mbps, will be implemented on the 2.4 GHz frequency band. The 802.11a, 802.11b, and 802.11 g standards are all physical layer standards, each of which can operate in connection with the current 802.11 media access control (MAC) standard, or with the enhanced standard referred to as 802.11e, which implements Quality of Service (QoS) capability.

As is well known in the wireless LAN art, one complication in the operation of a wireless network is the management of reliable communications among the various elements of the network within a finite bandwidth. Typically, multiple wireless network elements (e.g., laptop computers) are in communication with one another, with at least one of the network elements being a wireless access point that in turn connects to a network backbone; alternatively, especially in the home or small office environment, the wireless access point connects to a wide area network (WAN), such as the Internet, through a modem. In each case, communications may be carried out among the multiple network elements themselves, and also upstream from the access point to and from locations on a larger network or on the Internet. For reliable communications, of course, communications to and from each individual network element must not collide or interfere with communications to and from the other network elements.

In conventional 802.11 wireless communications, the various network elements all share the same frequencies, operating either according to a frequency-hopping scheme or Direct-Sequence Spread-Spectrum (DSSS) technology. In frequency-hopping, transmissions change frequency within a finite bandwidth over time, following a pseudo-random pattern. Wireless networks in the United States that follow the 802.11 standard utilize DSSS, in which each data bit is spread by a pseudo-random code. In effect, DSSS code spreading spreads the transmission over a wider band of frequencies, and provides noise immunity by incorporating inherent redundancy in the transmitted signal. In either case, as mentioned above, the wireless network elements within a service area share the same frequencies, both for transmission and receipt. In the event that transmissions within the frequency band collide, the message "packets" or "frames" that are corrupted by the collision are retransmitted. Collisions therefore reduce the effective data rate of the network. Conversely, idle time spent by the network elements in order to avoid collisions also reduce the effective data rate of the network.

According to conventional approaches, collision avoidance is carried out among the various network elements themselves, in combination with the wireless access point. According to a conventional approach, of the type referred to as non-persistent Carrier Sense Multiple Access (CSMA), each station within a service set (i.e., area served by one or more wireless access points) of the network listens for traffic from all other users in that service set, and waits until the network channel is idle before transmitting. While the channel is busy, each station that is ready to transmit a frame waits until the channel is clear before attempting its own transmission.

Fairness in assigning the next available transmission time is determined, under the 802.11 standard, by each station waiting for a pseudo-randomly selected period after the completion of a prior frame, before beginning its own frame transmission. In this conventional approach, each network element loads a counter with a pseudo-randomly selected value within a determined interval (0, CW], and begins counting down from this selected value after the prior frame is transmitted. Typically, the counting down begins after the acknowledgment by the destination network element of the receipt of a valid frame, followed by an interframe space referred to as the Distributed Interframe Space (DIFS). When the DIFS is over, each station waiting to transmit begins counting down from its random value. Upon a station's counter reaching zero, that station then begins transmission of its frame over the channel. The randomness in the setting of the counter ensures fairness among the various network elements in the service set. Of course, collisions may still occur, for example by a second station beginning transmission prior to its detecting that another station has already begun transmission. According to this conventional approach, if a collision occurs, the upper limit CW of the pseudo-random range is increased (typically doubled) at each station, improving the chances for a successful transmission, but at a cost of additional latency on the channel.

The upper limit CW of the pseudo-random value range varies from a minimum value $CW_{min}$ to a maximum value $CW_{max}$. Typically, the upper limit $CW_{max}$ is the capacity of the counters in the stations. According to conventional approaches, such as under the 802.11 standard, the minimum value $CW_{min}$ is fixed. For example, minimum value $CW_{min}$ has the value 31 for 802.14b networks, and the value 15 for 802.11a networks. By way of further background, it is believed that, under the draft 802.11e standard, minimum value $CW_{min}$ will be a programmable value that depends upon the particular traffic class, and that will be set by a broadcast information element.

By way of still further background, it is known in the art that the data throughput of a wireless network over a measurement period is maximized when the collision time $T_c$ equals the idle time $T_1$ within the measurement period.

BRIEF SUMMARY OF THE INVENTION

It is therefore an object of this invention to provide a wireless network, and network elements and stations within such a network, in which the data throughput is maximized.

It is a further object of this invention to provide such a network and elements, and a method of operating the same, in which the idle time and collision time are adjustable in response to current network conditions.

It is a further object of this invention to provide such a network, elements, and method, in which the adjustment of the idle and collision times can be automatically adjusted.

It is a further object of this invention to provide such a network, elements, and method, in which the data throughput over the network is maximized without expressly measuring the idle and collision times.

Other objects and advantages of this invention will be apparent to those of ordinary skill in the art having reference to the following specification together with its drawings.

The present invention may be implemented by the automatic adjustment of the minimum value of a range of wait times for each network element in a wireless network or service set. These wait times correspond to times that the elements must wait after completion of a transmission frame over the network channel, before initiating transmission of a frame itself. The wait times are implemented by a counter, in each station, counting down from a back-off value that is pseudo-randomly selected by each waiting station. The random selection of the back-off value is taken from a range (0, CW], where the value CW ranges from a minimum value $CW_{min}$ to a maximum value $CW_{max}$. According to this invention, the minimum value $CW_{min}$ is determined according to collision results detected on the channel, either by estimating idle and collision times from measurements, or in response to measured successful transmission times.

BRIEF DESCRIPTION OF THE SEVERAL VIEWS OF THE DRAWING

FIG. 5 is a flow diagram illustrating the operation of the wireless access point of FIG. 4 according to a first preferred embodiment of the invention.

FIG. 7 is a flow diagram illustrating the operation of the wireless access point of FIG. 2 according to a second preferred embodiment of the invention.

DETAILED DESCRIPTION OF THE INVENTION

This invention will be described in connection with its preferred embodiments in a context in which these preferred embodiments are particularly beneficial. More specifically, the preferred embodiments of this invention will be described in this specification in connection with a wireless computer network, in the context of a basic service set (BSS). It is of course contemplated that this invention may be implemented into other network applications, including extended service set (ESS) wireless networks, wireless networks according to standards other than the current and draft IEEE 802.11 specifications, and indeed in a wide range of other communications applications. Further, it is contemplated that those skilled in the art having reference to this specification will be readily able to implement this invention in these described embodiments and its variations and alternatives, all of which are contemplated to be within the true scope of this invention as claimed.

Figure 1:
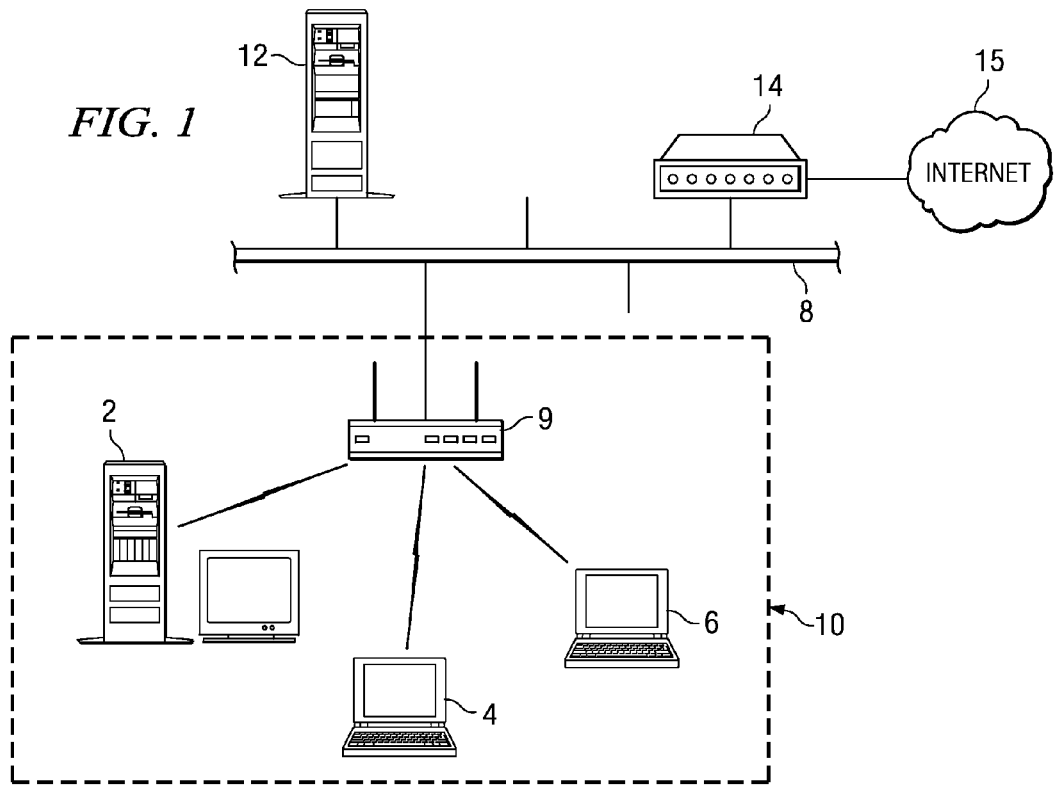
FIG. 1 is an electrical diagram, in block and schematic form, of a wireless network service set within which the preferred embodiments of the invention are implemented.

FIG. 1 illustrates an example of a wireless network, such as a wireless Local Area Network (LAN), including network elements constructed according to the preferred embodiments of the invention. In this exemplary implementation, personal computer 2, and laptop computers 4, 6, each include wireless adapters for wireless communication with wireless access point 9. Wireless access point 9, in turn, connects to Ethernet backbone 8 in this example, and thus places computers 2, 4, 6 in communication with server 12, and with the Internet via modem 14. In this arrangement, wireless access point 9, in combination with computers 2, 4, 6, correspond to a Basic Service Set (BSS), in the vernacular of the art.

As known in the art, another arrangement of a wireless Local Area Networks (WLANs) is the Extended Service Set (ESS), which includes multiple BSS arrangements. The several wireless access points within an ESS each serve multiple computers and workstations, and are in communication with one another to forward traffic from a station in one BSS to a station in another BSS. Another wireless LAN is the "ad hoc" network set, in which multiple computers with wireless network adapters all communicate with one another, without a wireless access point; in this arrangement, one of the multiple computers may serve as a gateway to a WAN, if desired. As mentioned above, it is contemplated that this invention is useful in any of these wireless network arrangements.

Figure 2:
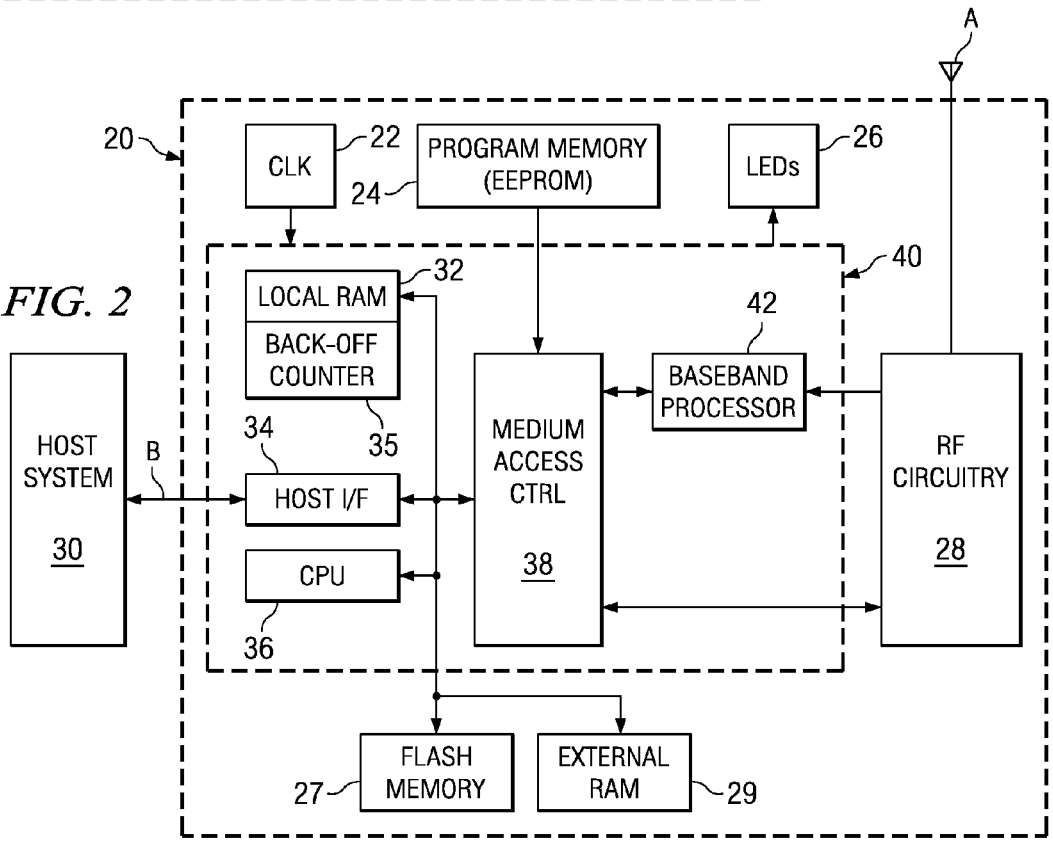
FIG. 2 is an electrical diagram, in block form, of a wireless network adapter constructed according to the preferred embodiments of the invention.

As mentioned above, each of computers 2, 4, 6 within BSS 10 of FIG. 1 include a wireless network adapter, by way of which communications are transmitted to and received from wireless access point 9. Referring now to FIG. 2, the construction of an example of these wireless adapters will now be described, relative to exemplary wireless adapter 20. Of course, wireless adapters according to other architectures and arrangements, for example implementing more or less of the functionality described herein by way of custom hardware and custom logic, are also contemplated to be within the scope of this invention.

In the diagram of FIG. 2, wireless network adapter 20 is coupled to host system 30, by way of a corresponding bus B. Host system 30 corresponds to one of personal computer 2, or laptop computers 4, 6, in BSS 10 of FIG. 1. Alternatively, host system 30 may be any sort of computing device capable of wireless networking, in a wireless LAN arrangement such as BSS 10 of FIG. 1 or alternative realizations. In this example, wireless network adapter 20 may correspond to a built-in wireless adapter that is physically realized within its corresponding host system 30, to an adapter card installable within host system 30, or to an external card or adapter coupled to host computer 30. The particular protocol and physical arrangement of bus B will, of course, depend upon the form factor and specific realization of wireless adapter 20. Examples of suitable buses for bus B include PCI, MiniPCI, USB, CardBus, and the like.

Wireless adapter 20 in this example includes spread spectrum processor 40, which is bidirectionally coupled to bus B on one side, and to radio frequency (RF) circuitry 28 on its other side. RF circuitry 28, coupled to antenna A, performs the analog demodulation, amplification, and filtering of RF signals received over the wireless channel and the analog modulation, amplification, and filtering of RF signals to be transmitted by wireless network adapter 20 over the wireless channel. RF circuitry 28 may be realized by conventional circuitry known in the art for such functionality in wireless network adapters; an example of such circuitry includes the RF2498B 2.4 GHz spread-spectrum transceiver available from RF Micro Devices, Inc., in combination with the RF2494 receive low-noise amplifier/mixer also available from RF Micro Devices, Inc. and the MAX2242 linear power amplifier available from Maxim Integrated Products, Inc., arranged in the conventional manner.

Also included within wireless adapter 20 are support circuitry and functions, including clock circuit 22 for generating a system clock signal applied to spread spectrum processor 40 (e.g., at a frequency of 22 MHz or 44 MHz), flash memory 27 and external random access memory (RAM) 29 for persistent and temporary storage of data values used in the wireless network functionality, and light-emitting diodes (LEDs) 26 for providing the human user with visual indications of network connection and activity in the conventional manner. In addition, program memory 24 is provided within wireless network adapter 20, for example in the form of electrically erasable/programmable read-only memory (EEPROM). Program memory 24 preferably stores sequences of operating instructions executable by spread-spectrum processor 40, including such sequences for controlling the operation of spread-spectrum processor 40 according to the preferred embodiments of the invention, which will be described in further detail below. Implementation of program memory 24 as EEPROM permits the updating and upgrading of the firmware for wireless network adapter 20. Because the program instructions for the preferred embodiments of the invention are preferably contained within program memory 24, it is believed that the cost of implementing the present invention will be relatively minimal. In addition, it is contemplated that this invention can be readily and inexpensively implemented into existing wireless network adapters by a rewriting of the firmware, as represented by EEPROM program memory 24 in this example.

According to this embodiment of the invention, spread-spectrum processor 40 performs the bulk of the digital processing in wireless network adapter 20, including such operations that are under the control of program instructions stored in program memory 24. The specific architecture of spread-spectrum processor 40 can vary, particularly in different implementations, and also according to the extent to which functions are to be carried out by custom logic hardware rather than under program control. The preferred architecture of spread-spectrum processor 40, as illustrated in FIG. 2, follows that of the TNETW1100 single-chip WLAN medium access controller (MAC), available from Texas Instruments Incorporated. In the event that these devices are used to implement spread-spectrum processor 40, the particular functionality and methods of the preferred embodiments of the invention will be realized by program instructions written into and stored in program memory 24. Alternatively, to the extent desired, the specific logic circuitry can be modified from these devices to perform the functions of the preferred embodiments of the invention. In either case, it is contemplated that those skilled in the art, having reference to this specification, will be readily able to implement the preferred embodiments of this invention in such a spread-spectrum processor and wireless network adapter as that shown, or its alternatives, without undue experimentation.

The architecture of spread-spectrum processor 40 according to the preferred embodiments of the invention include embedded central processing unit (CPU) 36, for example realized as a reduced instruction set (RISC) processor, for managing high level functions within spread-spectrum processor 40, including the control of the initiation of transmission according to the preferred embodiments of the invention as will be described below. Host interface 34 directly supports the appropriate physical interface to bus B and host system 30, under the management of embedded CPU 36. Embedded CPU 36, as well as the other functions in spread-spectrum processor 40, use local RAM 32 for code execution and data buffering. According to the preferred embodiments of the invention, a portion of local RAM 32 is reserved as back-off counter 35.

Medium access controller (MAC) 38 and baseband processor 42 are also implemented within spread-spectrum processor 40 according to the preferred embodiments of the invention. The functionality performed by MAC 38 and baseband processor 42 corresponds to that in conventional wireless network adapters, for example as implemented in the TNETW1100 single-chip WLAN medium access controller (MAC) noted above. In summary, MAC 38 generates the appropriate packets for wireless communication, such packets including the acknowledge (ACK), RTS, CTS, probe response, and beacon packets; MAC 38 also provides encryption and decryption functionality, and can be used to implement wired equivalent privacy (WEP). Baseband processor 42 performs conventional operations for coding and decoding transmitted and received data packets, for example to implement redundancy coding (e.g., turbo coding) to improve the success rate of communicated packets, even in noisy environments. In combination, MAC 38 and baseband processor 42 cooperate to efficiently parse received frames independently from embedded CPU 36.

Figure 3:
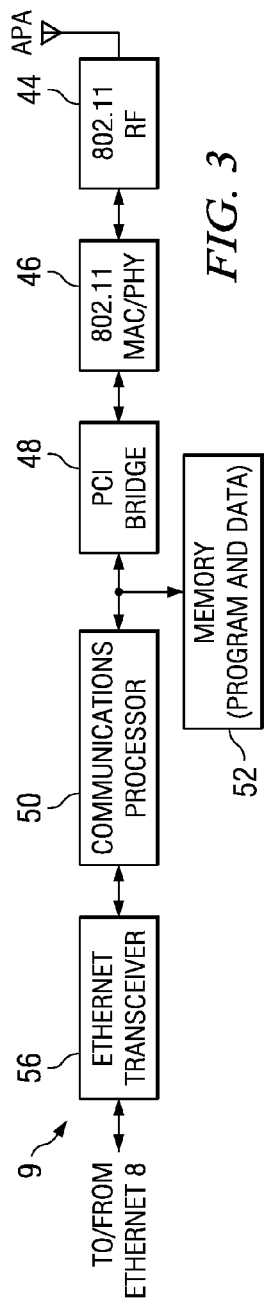
FIG. 3 is an electrical diagram, in block form, of a wireless access point constructed according to the preferred embodiments of the invention.

FIG. 3 illustrates, in block form, an example of the architecture of wireless access point 9 in BSS 10, according to the preferred embodiments of the invention. It is contemplated that wireless access point 9 may be arranged according to other architectures, as desired, and as such the high level diagram of FIG. 3 is provided by way of example only.

Wireless access point 9 includes RF circuitry 44, which transmits and receives signals via access point antenna APA. The functionality of RF circuitry 44 corresponds to that of RF circuitry 28 of wireless network adapter 20 described above. Similarly, wireless access point 9 includes MAC/PHY circuitry 46, which performs the physical and medium access control layer functions of wireless access point 9, in similar manner as described above relative to wireless network adapter 20.

Wireless access point 9 also includes communications processor 50, which is in communication with MAC/PHY circuitry 46 via PCI bridge 48, and with Ethernet transceiver 56. Ethernet transceiver 56 controls the communication of signals over Ethernet backbone 8. Communications processor 50 is preferably arranged as programmable logic, such as a microprocessor or digital signal processor (DSP), and as such is in communication with data and program memory 52. An example of a suitable programmable integrated circuit for communications processor is the TMS320C6000 digital signal processor (DSP) available from Texas Instruments Incorporated. Communications processor 50 performs the appropriate conventional functions for managing the operation of wireless access point 9, and for effecting communication and routing of data to and from the wireless network and to and from Ethernet backbone 8, in the conventional manner.

According to the preferred embodiments of the invention, communications processor 50 also performs many of the measurement and management functions in controlling the transmission of frames over the wireless network channel, as will be described below. To perform these functions, it is contemplated that communications processor 50 will execute various program instructions that are written to and stored in memory 52; alternatively, of course, communications processor 50 may include custom logic hardware for performing some or all of that functionality. Because the program instructions for the preferred embodiments of the invention are preferably contained within memory 52, the cost of implementing the present invention, either by original manufacture or by upgrading firmware as part of memory 52, is expected to be relatively inexpensive.

Figure 4:
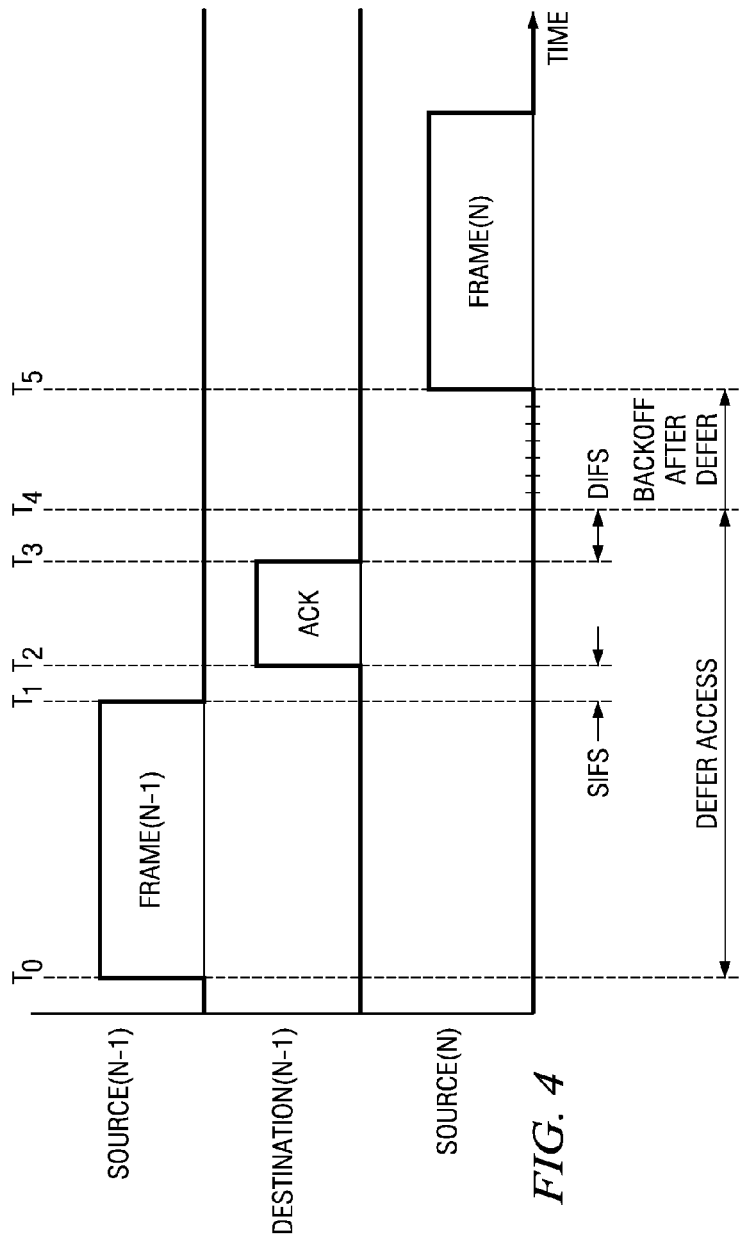
FIG. 4 is a timing diagram illustrating the timing of the transmission of successive frames over a wireless network channel in the service set of FIG. 1, according to the preferred embodiments of the invention.

Referring now to FIG. 4, the operation of network elements in BSS 10 in effecting transmissions will now be described, to provide context for the preferred embodiments of the invention. FIG. 4 illustrates transmission activity over the shared wireless channel of BSS 10. In this example, BSS 10 operates according to DSSS technology, with each transmission encoded and modulated over a spread spectrum across the bandwidth used within BSS 10. As such, the wireless channel illustrated in FIG. 4 is able to support only a single transmission at a time.

In the example of FIG. 4, one of the network elements (either one of computers 2, 4, 6 or wireless access point 9) is transmitting a frame over the wireless channel from time to $t_0$ time $t_1$. The source of this frame is referred to as SOURCE(n-1) in FIG. 4, and the destination of the packet is referred to as DESTINATION(n-1), for communicated frame n-1. The transmission of frame n-1 ends at time $t_1$, and is followed by a Short Interframe Space (SIFS) under the 802.11 standard, during which time all network elements refrain from transmission over the channel. Following the SIFS, at time $t_2$, the destination network element DESTINATION(n-1) issues an acknowledgement of the successful receipt of frame n-1; this acknowledgement ends at time $t_3$. Of course, if the destination network element received an errored frame due to a collision or noise event, a corresponding message will be issued to the source so that retransmission can follow. The frame transmission is then complete, at time $t_3$. Following the frame acknowledgment, all network elements in BSS 10 refrain from transmission from time $t_3$ to time 4, observing the Distributed Interframe Space (DIFS) according to the 802.11 standard. In summary, access to the wireless transmission channel is deferred, for all network elements besides the active source and destination (SOURCE(n-1) and DESTINATION (n-1), respectively, in this example) for the total time from initiation of the transmitted frame, at time to, until completion of the DIFS after frame acknowledgement, at time $t_4$.

After the DIFS has elapsed, beginning at time $t_4$, the network elements in BSS 10 are permitted to initiate the transmission of a frame on the wireless channel. According to the 802.11 standard, a back-off period is determined, by each network element, to arrive at a fair allocation of the channel. In this approach, beginning at the end of the DIFS at time $t_4$, each network element that has a frame ready to transmit counts down from a pseudo-random value that is loaded into its back-off counter 35.

Upon one of the network elements reaching the terminal value of the count (i.e., zero), that network element checks the channel to determine whether it is busy. If not, the network element initiates transmission of frame n, at time $t_5$ in FIG. 4. Once the channel is busy, for a transmission from the network element having the lowest random value for its count, the other network elements with frames ready to transmit will freeze their respective back-off counters. Once the channel has been idle for a DIFS time again, the counting down process for these network elements will resume as before (i.e., until the count reaches zero, when a transmission will be initiated or, if the channel is again busy, the counter will again be frozen). The determination of the range from which the pseudo-random count values are selected, for each network element in BSS 10, according to this invention will be described in further detail below.

The range over which the pseudo-random value is selected by the network elements, in determining the value loaded into back-off counter 35 according to the IEEE 802.11 standard, has a lower limit of zero and an upper limit of a value CW. The upper limit CW varies within a range between a minimum value $CW_{min}$ and a maximum value $CW_{max}$. The minimum value $CW_{min}$ of upper limit value CW is the initial value of upper limit CW used in the pseudo-random selection sequence.

Collisions can still occur in this arrangement, however. A collision is caused by a second network element, after its back-off counter 35 has counted down to zero, initiating a transmission before it is able to detect that a first network element has initiated transmission. In this event, the frame is errored, and the colliding network elements then increase the upper limit CW of the range over which the pseudo-random value is selected. For example, each of the colliding network elements may simply double the current value of this upper limit value CW. Those network elements which are still counting down, and have not attempted a transmission yet, need not increase their upper limit CW. The higher upper limit value CW tends to spread out the time at which the network element counts its corresponding back-off counters 35 to zero, but at a cost of increased idle time. As mentioned above, upper limit value CW is increased up to a maximum value $CW_{max}$.

It has been observed, in connection with this invention, that the upper limit minimum value $CW_{min}$ can be used to control the performance of the wireless network. In general, as value $CW_{min}$ increases, the likelihood of a collision decreases, while as value $CW_{min}$ decreases, the idle time of the network decreases. As noted above in connection with the Background of the Invention, however, in conventional systems this upper limit minimum value $CW_{min}$ is fixed by the network standard, or by the class of service provided to a specific network element. According to the preferred embodiments of this invention, however, the upper limit minimum value $CW_{min}$ adjusted according to network conditions and traffic, to optimize the performance of the network over time and over varying conditions and population.

Referring now to FIG. 5, a method of determining upper limit minimum value $CW_{min}$, in response to conditions on the wireless network, and according to a first preferred embodiment of the invention, will be described in detail. The operations illustrated in FIG. 5 are preferably performed by one of the network elements in the service set. Referring to the example of BSS 10 in FIG. 1, the operations of FIG. 5 are preferably performed by wireless access point 9, and primarily by communications processor 50 in access point 9 (FIG. 3). In other arrangements, the determining of upper limit minimum value $CW_{min}$ according to this preferred embodiment of the invention can be performed by one of the wireless access points (for example in an ESS), or by one of the networked computers (for example, in an ad hoc wireless network. While the following description will refer to the construction of access point 9 as described in FIG. 3, by way of example, it is contemplated that those skilled in the art having reference to this specification will be readily able to implement this invention in the corresponding elements of other architectures and network elements.

The method according to this embodiment of the invention begins with process 60, in which communications processor 50 sets initial values for idle time $T_1$ and collision time $T_c$. Initial idle time $T_1(0)$ corresponds to an estimate of the time duration within a measurement period T of arbitrary length (e.g., one second), during which the wireless network channel is idle, not carrying traffic. Similarly, initial collision time $T_c(0)$ is an estimate of the time duration, over the same measurement period T, during which transmitted frames are corrupted due to collisions on the channel. These initial times $T_1(0)$, $T_c(0)$ can be preselected for the network, for example as set by an industry standard, or alternatively can be based on a measurement or human estimate. Also in process 60, iteration counter k is initialized to zero.

In process 62, pseudo-random range upper limit minimum value $CW_{min}$ is initialized by communications processor 50. The initial value $CW_{min}(0)$ can be preselected for the network, for example as set by an industry standard, can be based on measured or estimated values of initial idle and collision times $T_1(0)$, $T_c(0)$, or can be set to an arbitrary or estimated value based on other criteria. In process 64, the initial value $CW_{min}(0)$ is then broadcast by wireless access point 9, via MAC/PHY 46 and RF circuitry 44 (FIG. 3), to the network elements in BSS 10. Wireless adapters 20 (FIG. 2) in computers 2, 4, 6, and other elements within BSS 10, then store this initial value $CW_{min}(0)$ in their internal memory 32, and use this initial value $CW_{min}(0)$ in the pseudo-randomization of the back-off delays, as will now be described relative to FIG. 6.

Figure 6:
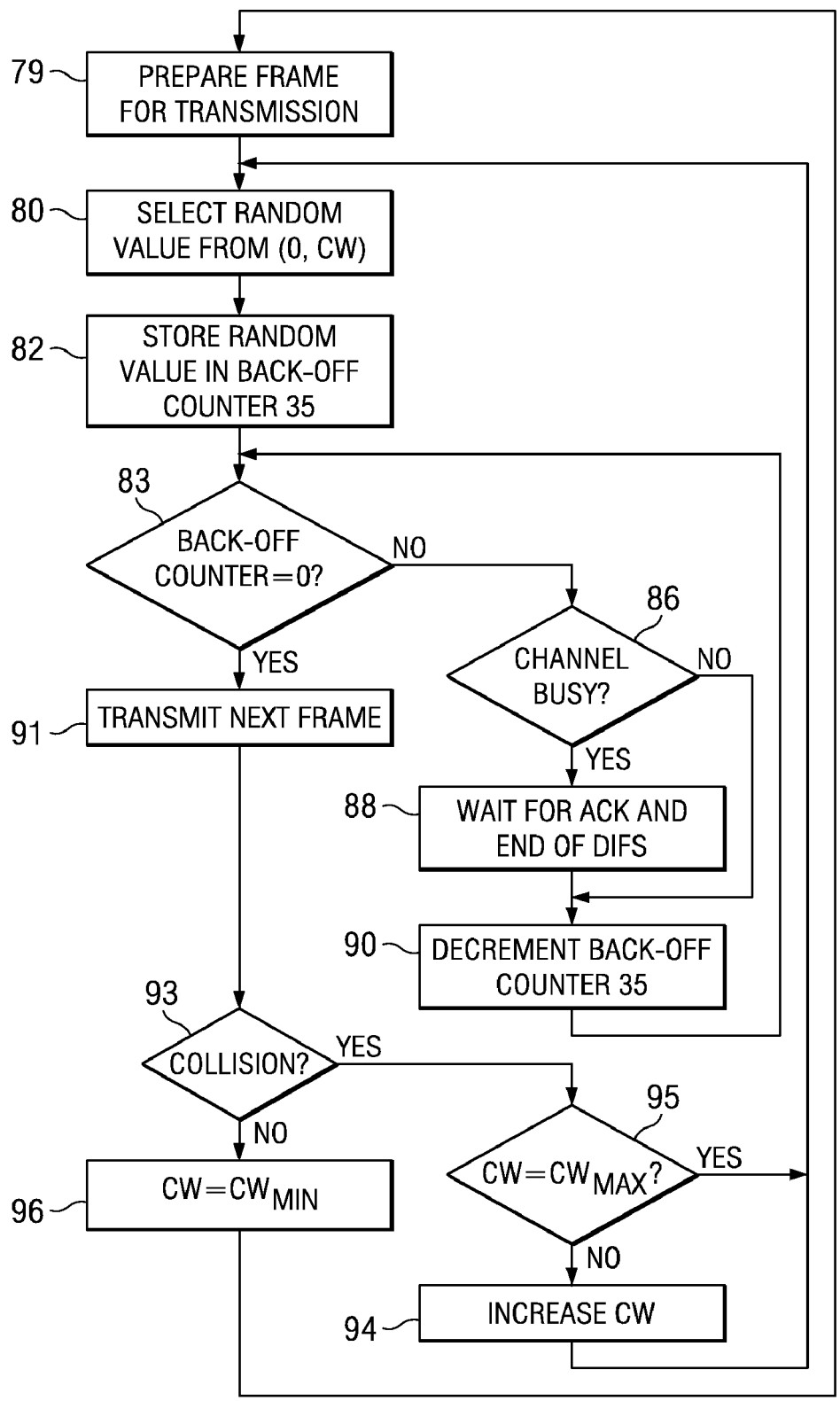
FIG. 6 is a flow diagram illustrating the operation of the wireless adapter of FIG. 2 according to the preferred embodiments of the invention.

The processes of FIG. 6 are carried out by the wireless adapter 20 of each network element (computer 2, 4, 6) that has a frame ready to transmit over the wireless network channel of BSS 10 of FIG. 1. A similar set of processes are executed by wireless access point 9, in the event it has a frame ready to transmit to one of the other network elements. From the standpoint of one of wireless adapters 20, by way of example, it is contemplated that the processes of FIG. 6 are executed by embedded CPU 36 in spread-spectrum processor 40; it is understood, of course, that the particular circuitry carrying out these steps will vary with different implementations.

Preparation for transmission of a frame is first carried out by MAC circuitry 38 and baseband processor 42 in process 79, by encoding and modulating the frame in the conventional manner. Embedded CPU 36 then executes a pseudo-random number generator selection routine, in process 80, to pseudo-randomly select a value within the range (0, CW], the upper limit value CW being stored in RAM 32 of spread-spectrum processor 40. In process 82, CPU 36 stores this randomly selected value in back-off counter 35 of RAM 32. In decision 83, embedded CPU 36 tests the state of back-off counter 35 against a lower limit (e.g., zero). If it is not yet zero (decision 63 is NO), the network element probes the wireless channel, to determine whether it is currently busy, reflected by decision 86. If the channel is not busy (decision 86 is NO), back-off counter 35 is decremented in process 90, and the decremented value is again tested against zero in decision 83, as before. If the channel is busy (decision 86 is YES), wireless adapter 20 freezes the current contents of back-off counter 35 by waiting for the end of the current transmission, followed by the ACK signal from the destination of the current frame, and the DIFS interval (FIG. 4), in process 88. Once the DIFS has elapsed after this transmission by a different network element, counting-down continues with the decrementing of back-off counter 35 in process 90, and testing of the current back-off counter 35 value against zero, in decision 83.

Upon the back-off counter 35 reaching zero (decision 83 is YES), embedded CPU 36 in wireless adapter 20 controls RF circuitry 28 to begin transmission of the frame that MAC circuitry 38 and baseband processor 42 previously generated for transmission in process 79. Transmission occurs in process 91. In decision 93, wireless adapter 20 receives and tests the ACK signal from the destination of the frame, to determine whether the frame was successfully received or instead was corrupted, such as in the result of collision. If the transmission was successful (decision 93 is NO), embedded CPU 36 resets the current value of upper limit to its current minimum value $CW_{min}$, in process 96, and control passes back to process 79 in which wireless adapter 20 prepares the next frame for transmission.

If a collision occurred (decision 93 is YES), the current upper limit CW, which is the upper limit of the range from which the pseudo-random back-off starting value is selected, is compared against a maximum value $CW_{max}$, in decision 95. If the current upper limit CW has not yet reached maximum value $CW_{max}$ (decision 95 is NO), upper limit CW is increased in process 94. Preferably, the increase of upper limit CW in process 94 is performed by a simple left-shift of the binary value, shifting a "1" bit into the least significant bit, effectively doubling upper limit CW and adding 1, so that $CW(k+1)=[(2CW(k))+1]$. The transmission attempt begins again, with the reselection of a new random value from the range (0, CW], in process 80. If upper limit CW has reached its maximum $CW_{max}$ (decision 95 is YES), upper limit CW is not further increased, but the transmission operation simply repeats again from the selection of a new random backoff value in process 80.

Referring back to FIG. 5, the method of optimizing the minimum value $CW_{min}$ of the upper limit of the randomization range continues, in processes 66 and 68, by communications processor 50 measuring the collision and idle times, respectively, over an arbitrarily selected measurement period T. An example of the duration of a measurement period T, for conventional data rates such as those contemplated by the 802.11b standard, is one second. In any event, it is preferred that the measurement period T correspond to the beacon interval of BSS 10. According to this embodiment of the invention, communications processor 50 performs process 66 by measuring the time within measurement period T that was consumed by corrupted frames due to collision, for example by counting the "slots" within the measurement period that are occupied by collisions. Similarly, communications processor 50 performs process 68 by measuring the idle time, preferably by counting the number of idle slots within the same instance of measurement period T during which the wireless channel was idle, with no traffic. The idle time corresponds to time during which no network adapter has a frame ready to transmit, and also the back-off periods between frames, while each network adapter 20 is counting down its back-off counter 35.

In order to avoid errors due to inconsistencies in unit (sec, msec, etc.), it is preferred that the idle time $T_i$ and collision time $T_c$ be normalized with respect to the measurement period T:

$$T_i = \frac{\hat{T}_i}{T}$$

$$T_c = \frac{\hat{T}_c}{T}$$

where $\hat{T}_c$ and $\hat{T}_i$ are the measured collision and idle durations, respectively. This normalization may be considered as part of each of processes 66, 68.

The normalized measured values of idle time $T_i$ and collision time $T_c$ are unbiased estimates of the expected values of these parameters. Of course, these measured values will vary from measurement period to measurement period, so that communications processor 50 will derive time sequences of these values, namely $T_i(k)$ and $T_1(k)$. For purposes of stability, it is preferred that the decisions made from these time sequences incorporate some sort of averaging or smoothing, to prevent overcorrection due to a spurious measurement period. According to this preferred embodiment of the invention, therefore, communications processor 50 applies low-pass filtering to the most recently measured normalized measured idle and collision times $T_i(k)$, $T_c(k)$, in processes 70 and 72.

According to this preferred embodiment of the invention, the low-pass filter of process 70 is a relatively simple first order weighting of normalized measured collision time $T_c(k)$, to produce filtered collision time $T_{c,LPF}(k)$ as follows:

$$T_{c,LPF}(k) = (1-\alpha)T_{c,LPF}(k-1) + \alpha T_c(k)$$

Similarly, process 72 applies a low pass filter to normalized measured idle time $T_1(k)$ to produce filtered idle time $T_{1,LPF}(k)$:

$$T_{1,LPF}(k) = (1-\alpha)T_{1,LPF}(k-1) + \alpha T_1(k)$$

In each case, $\alpha$ is a forgetting factor ranging from zero to one, and $T_{1,LPF}(k-1)$, $T_{c,LPF}(k-1)$ are the filtered idle and collision times, respectively, from the prior iteration. Typically, forgetting factor $\alpha$ will depend upon the particular implementation, but intuitively should be larger for longer measurement periods T. Of course, the order in which filter processes 70, 72 are performed is arbitrary.

Following filtering processes 70, 72, communications processor 50 next updates the current minimum value upper limit $CW_{min}(k)$ in process 74, using the filtered idle and collision times $T_1(k)$, $T_c(k)$. This adjustment is based on the intuitive and proven relationship that data throughput is maximized, within a given time interval, when the idle and collision times equal one another. The direction in which minimum value upper limit $CW_{min}(k)$ is adjusted depends upon the polarity of the difference between filtered idle and collision times $T_1(k)$, $T_c(k)$, according to this relationship. If the idle time is greater than the collision time, minimum value upper limit $CW_{min}(k)$ can be reduced, while if the collision time is greater than the idle time, minimum value upper limit $CW_{min}(k)$ should be increased. According to this preferred embodiment of the invention, the adjustment of minimum value upper limit $CW_{min}(k)$ is performed by communications processor 50 in process 74, according to a stochastic approximation and updating algorithm that follows the equation:

$$CW_{min}(k+1) = CW_{min}(k) + \lambda[T_{c,LPF}(k) - T_{1,LPF}(k)]$$

In this updating equation, the value $\lambda$ is a learning factor greater than zero, and sets the step length of the update. In general, it has been observed that small values of learning factor $\lambda$ are best suited for tracking system dynamics.

According to this preferred embodiment of the invention, and considering that back-off counter 35 in wireless adapter 20 is a binary counter, minimum value upper limit $CW_{min}(k+1)$ is an integer value. Accordingly, the setting of minimum value upper limit $CW_{min}(k+1)$ in process 74 will necessarily round the result of the calculation, either by rounding to the nearest integer, or to the next higher integer value, as desired.

Alternatively, the values of minimum value upper limit $CW_{min}$ may be limited to only certain integers, such as those of the form $2^n-1$ for $n \geq 1$, in which case the rounding will comprehend the permitted values. For wireless adapters 20 having this limitation, the setting of minimum value upper limit $CW_{min}(k+1)$ in process 74 would round to the nearest value of the form $2^n-1$, with nearness determined by the arithmetic difference between minimum value upper limit $CW_{min}(k+1)$ and the next higher and next lower values of $2^n-1$, or alternatively by comparing ratios of minimum value upper limit $CW_{min}(k+1)$ with these values.

Once the new minimum value upper limit $CW_{min}(k+1)$ is determined, in process 74, wireless access point 9 broadcasts this new value $CW_{min}(k+1)$ to all network elements in BSS 10, in process 76. The particular manner of broadcast can vary, depending upon the configuration of the network and the network elements within BSS 10. For example, in the implementation of this invention within existing "legacy" wireless networks, or in other networks that do not include quality of service (QoS) capabilities, it is contemplated that the adjustments to minimum value upper limit $CW_{min}(k+1)$ may be broadcast by access point 9 as an additional new field within a beacon frame or probe response, or alternatively by using reserved bits within existing fields in these frames.

In legacy networks, it is contemplated that not all wireless adapters in network elements may be capable of receiving and responding to adjustments in minimum value upper limit $CW_{min}$. In this case, it is preferred that those network elements with wireless network adapters 20 constructed according to this invention not be placed in a disadvantage relative to the others, by having their minimum value upper limit $CW_{min}$ increased to a higher value than specified by the standard. In that case, access point 9 preferably adjusts each minimum value upper limit $CW_{min}(k+1)$ to the minimum of the specification limit (e.g., 31 for 802.11b) and the value calculated in process 74 as described above.

Alternatively, as mentioned above, future wireless networks such as contemplated in the IEEE 802.11e standard may include QoS classes. In the 802.11e implementation, the adjusted minimum value upper limit $CW_{min}(k+1)$ is preferably transmitted by access point 9 in process 76 during beacon frames or probe response frames, within the QoS Parameter Set element in those frames. Specifically, the QoS Parameter Set element format under 802.11e includes a field specified as CWPFactor[TC] values. It is contemplated that this embodiment of the invention can be implemented by access point 9 including the adjusted minimum value upper limit $CW_{min}(k+1)$, either as an absolute value or an adjustment to a previous value, within this CWPFactor[TC] field.

According to this embodiment of the invention, each wireless network adapter 20 in the network elements receive and store the new value $CW_{min}(k+1)$ in their local memory, such as RAM 32, for use in the next time that the back-off delay after frame transmission is to be executed. Index k is incremented in process 78, and the process repeats with a new measurement in process 66.

Figure 8:
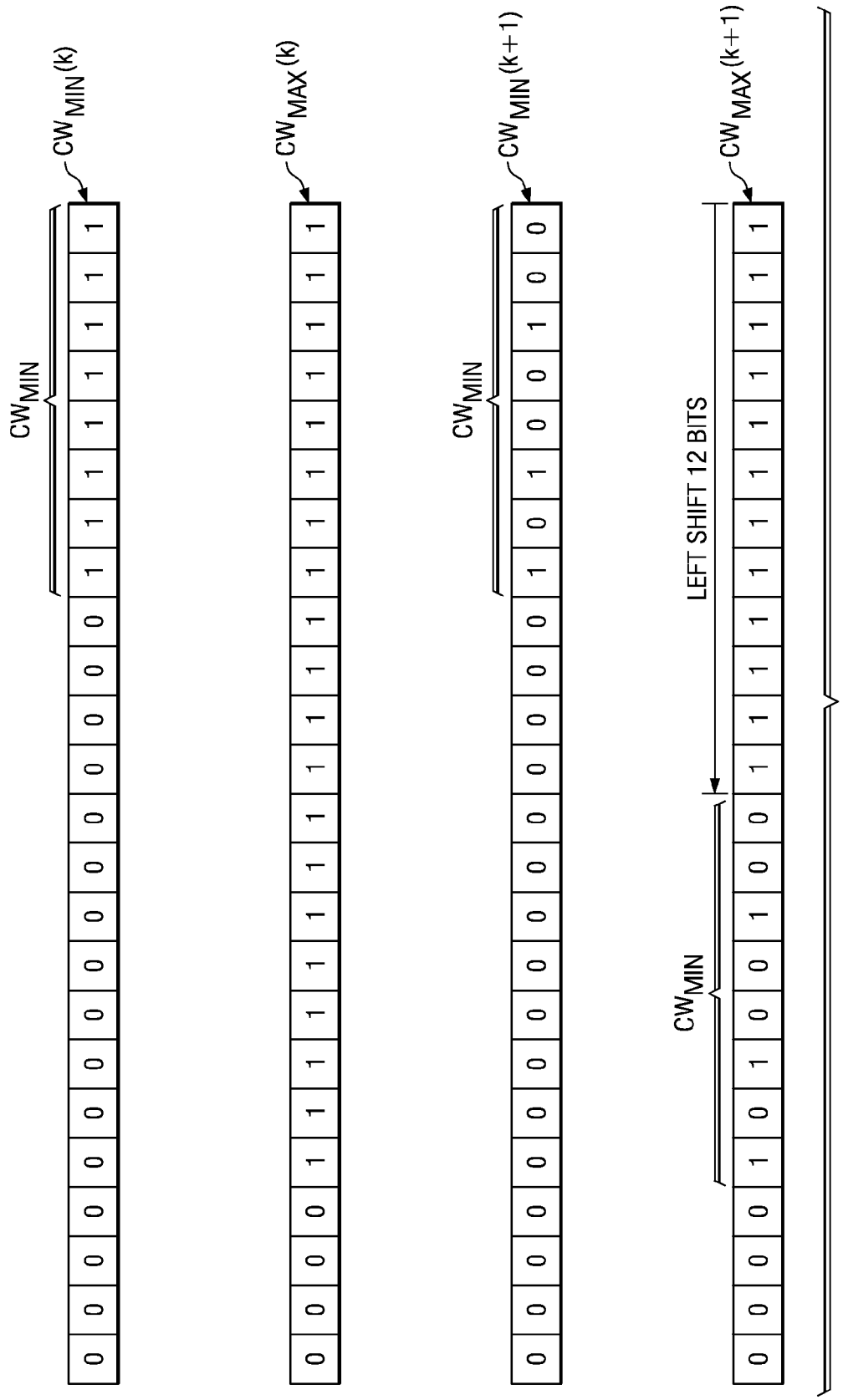
FIG. 8 illustrates exemplary values of the minimum and maximum values of the upper limit of a pseudo-random number range, according to the preferred embodiments of the invention.

As described above, a maximum value upper limit $CW_{max}$ exists, and is stored within RAM 32 of spread-spectrum processor 40, to limit the increasing of pseudo-random range upper limit CW in the event of collisions. If minimum value upper limit $CW_{min}$ is permitted to be any integer, it is preferred that the maximum value upper limit $CW_{max}$ also be adjusted at the same time as minimum value upper limit $CW_{min}$ is adjusted in the network elements, in response to process 76. This adjustment must comprehend the manner in which upper limit CW is increased in the event of a collision (process 94 of FIG. 6), to ensure that the increased value of upper limit CW will, at some point, equal the maximum value $CW_{max}$. FIG. 8 illustrates the preferred adjustment of maximum value upper limit $CW_{max}$ according to the preferred embodiments of the invention.

In the example of FIG. 8, iterated minimum value upper limit $CW_{min}(k)$ has the value $0000FF_{16}$. Also in this example, the incrementing of upper limit CW in response to a collision (process 94 of FIG. 6) is a left-shift of the current upper limit, with a "1" shifted into the least significant bit. In this example, maximum value upper limit $CW_{max}(k)$ has the value $0FFFFF_{16}$, which represents twelve such shifts. FIG. 8 also illustrates an example of an adjusted minimum value upper limit $CW_{min}(k+1)$, which has the value of $0000A4_{16}$, which is an integer that is not constrained to the form $2^n-1$, and as such includes "0" bits in its representation. For the same incrementing of left-shift with "1" loaded into the LSB, maximum value upper limit $CW_{max}(k+1)$ is also adjusted to correspond to the adjustment in minimum value upper limit $CW_{min}(k+1)$. Specifically, maximum value upper limit $CW_{max}(k+1)$ is now $0A4FFF_{16}$, which is exactly the current iteration of minimum value upper limit $CW_{min}(k+1)$, shifted left by twelve bits (with "1" values filling the LSBs). As a result, assuming that minimum value upper limit $CW_{min}(k+1)$ remains constant, the upper limit CW will, after twelve collisions and corresponding adjustments (process 94), reach and equal the current iteration of maximum value upper limit $CW_{max}(k+1)$, as desired according to the preferred embodiments of the invention.

Alternatively, as mentioned above, the upper limit CW may be limited to the values fitting the form $2^n-1$, for $n \geq 1$, in which case both the minimum value upper limit $CW_{min}$ and the maximum value upper limit $CW_{max}$ are similarly constrained. In this case, the maximum value upper limit $CW_{max}$ need not be adjusted with adjustments to minimum value upper limit $CW_{min}$ because any adjustment to minimum value upper limit $CW_{min}$ will return eventually a value that is consistent with the maximum value upper limit $CW_{max}$, both of the form $2^n-1$.

According to this preferred embodiment of the invention, the repeated iterations of processes 66 through 78 will converge the minimum value upper limit $CW_{min}(k)$ to its optimum value, at which the idle and collision times are approximately equal. This optimization is readily able to contemplate the instantaneous state of BSS 10. For example, if only one computer 4 is present within BSS 10, there will necessarily be no collisions and thus the collision time $T_c$ will be zero. This single-element network is often present in the home environment, where the human user of a laptop computer wishes to access the Internet from various locations in the house. In this trivial case, minimum value upper limit $CW_{min}(k)$ will eventually converge to zero, in which case there will be no back-off delay between frames, and thus maximum throughput. In contrast, according to conventional techniques, the minimum value upper limit $CW_{min}$ will remain at its fixed value, so that the sole network element will continue to execute its back-off period when it is ready to transmit a new frame, even though there is no chance of a collision.

In many networks, the population of network elements in BSS 10 changes over time, as computers and other stations enter and leave. Because the likelihood of collision, and thus the collision time over the measurement period T, increases and decreases as the number of network elements increases and decreases, respectively, the minimum value upper limit $CW_{min}(k)$ will be adjusted accordingly, according to this preferred embodiment of the invention. The data throughput is therefore optimized by this preferred embodiment of the invention, for any particular condition of the network, as it may change over time.

Referring now to FIG. 7, a method of optimizing the minimum value upper limit $CW_{min}$ according to a second preferred embodiment of the invention will now be described. As in the case of the method of FIG. 5, it is contemplated that the processes according to this embodiment of the invention will largely be carried out by access point 9 in BSS 10, and in the example of FIG. 3, by communications processor 50 in access point 9. Of course, these processes may be carried out by other functions within the wireless network, depending upon the particular arrangement of the network and the processing capacity of elements in the network.

According to this second preferred embodiment of the invention, minimum value upper limit $CW_{min}$ is optimized directly to maximize the time consumed by successful transmissions within the measurement period T. As such, according to this embodiment of the invention, the assumption that data throughput is maximized when idle time equals collision time is not used, but rather the success time is directly measured. As such, it is preferred, for this embodiment of the invention, that all traffic be monitorable by one of the network elements; in 802.11b networks, such as BSS 10 (FIG. 1), the monitoring of the success rate, and determining and storage of the statistics of success, is carried out by wireless access point 9 because each packet passes through access point 9. In other networks, such as those according to draft standard 802.11e in which network elements can communicate with one another without passing the transmissions through wireless access point 9, it is contemplated that wireless access point 9 (or another network element) can monitor the success of transmissions that it does not itself route.

As shown in FIG. 7, in process 100, communications processor 50 sets an initial value for successful transmission time $T_s$. According to this embodiment of the invention, successful transmission time $T_s$ is the time duration of successful transmissions within BSS 10, during a measurement period T, of arbitrary length (e.g., one second). This initial time $T_s(0)$ can be preselected for the network, for example as set by an industry standard, or alternatively can be based on a measurement or human estimate, or simply may be initialized to an arbitrary number such as zero. Iteration counter k is initialized to zero, also in process 100. In process 102, pseudo-random range upper limit minimum value CWm is initialized by communications processor 50; this initial value $CW_{min}(0)$ can be preselected for the network, can be based on measured or estimated values of success rates over BSS 10, or simply can be set to an arbitrary or estimated value based on other criteria. Wireless access point 9 broadcasts the initial value $CW_{min}(0)$ to the network elements in BSS 10 in process 104, via MAC/PHY 46 and RF circuitry 44 (FIG. 3). As before, wireless adapters 20 in computers 2, 4, 6, and other elements within BSS 10 store this initial value $CW_{min}(0)$ and use it in the pseudo-randomization of the back-off delays, as described above relative to FIG. 6.

In process 106, wireless access point 9 measures the successful transmission time $T_c$ over an arbitrarily selected measurement period T. As before, the measurement period T is a time period that is convenient for the network, for example the beacon interval. In any case, the length of measurement period T is contemplated to be on the order of one second. Communications processor 50 preferably performs process 106 by counting the "slots" within the measurement period that are occupied by transmissions that are indicated (by an ACK signal or the like) to have been successfully received by the destination network element. This measurement may be carried out by resetting a counter upon the start of the measurement period, and incrementing the counter with each time "slot" occupied by a successful transmission.

As in the first embodiment of the invention, it is beneficial for the measured successful transmission time $T_s$ to be normalized with the measurement period T, to avoid any confusion due to selection of measurement units and the like. As such, the measurement of process 106 preferably normalizes the successful transmission time:

$$T_s = \frac{\hat{T}_s}{T}$$

where $\hat{T}_s$ is the measured successful transmission time over measurement interval T.

Similarly as above, for purposes of stability, it is preferred that the time sequence of successful transmission time $T_s$ be smoothed over time. Communications processor 50 accomplishes this, in process 110, by low-pass filtering the most recently measured normalized successful transmission time $T_s(k)$. Preferably, the low-pass filter of process 110 is a relatively simple first order weighting of normalized measured successful transmission time $T_s(k)$, to produce filtered collision time $T_{s,\ LPF}(k)$:

$$T_{s,\ LPF}(k)=(1-\alpha)T_{s,\ LPF}(k-1)+\alpha T_s(k)$$

As before, α is a forgetting factor ranging from zero to one, and $T_{s,\ LPF}(k-1)$ is the filtered successful transmission time from the prior (k−1) iteration. Also as before, the specific value of forgetting factor α will depend upon the particular implementation, but will generally vary with the length of measurement period T.

This filtered successful transmission time $T_{s,\ LPF}(k)$ is then used by communications processor 50 to update the current iterative value of pseudo-random range upper limit minimum value $CW_{min}(k)$, in process 114. In this case, there is no optimum condition of successful transmission time $T_s$ (as in the equating of idle and collision times, discussed above), but rather successful transmission time $T_s$ is to be maximized. According to this embodiment of the invention, a stochastic optimization can again be used, with the direction of the optimization depending upon the result of the previous update. The preferred updating algorithm in this preferred embodiment of the invention follows the equation:

$$CW_{min}(k+1)=CW_{min}(k)+\lambda(T_{s,\ LPF}(k)-T_{s,\ LPF}(k-1))$$
$$(CW_{min}(k-1))$$

As before, λ controls the step length of the update, and is preferably relatively small to control system dynamics. In this case, however, the direction of the updating is also controlled by the determination of whether the successful transmission time $T_s$ improved in the previous iteration, as indicated by the difference $T_{s,\ LPF}(k)-T_{s,\ LPF}(k-1)$, and is also controlled by the direction and magnitude of the minimum value change in that prior iteration, as indicated by the difference $CW_{min}(k)-CW_{min}(k-1)$. In other words, if the most recent iteration improved the successful transmission time $T_s$ (i.e., $T_{s,\ LPF}(k)-T_{s,\ LPF}(k-1)>0$), then the next iteration of minimum value $CW_{min}(k+1)$ will be adjusted in the same direction as the prior adjustment (i.e., depending on the polarity of the difference $CW_{min}(k)-CW_{min}(k-1)$). If the most recent iteration degraded the successful transmission time $T_s$, then the adjustment of minimum value $CW_{min}(k+1)$ in process 114 will be in the opposite direction. In any event, a lower limit of minimum value $CW_{min}$ should be obeyed. In addition, as mentioned above, minimum value $CW_{min}(k+1)$ should be rounded to the nearest integer, or class of integers (e.g., obeying the $2^n-1$ constraint), as appropriate for the particular implementation.

In process 116, wireless access point 9 then broadcasts the new minimum value $CW_{min}(k+1)$ to computers 2, 4, 6 in BSS 10; this new value is then used by these network elements in their back-off calculations (FIG. 6). Index value k is then incremented by communications process 50, in process 118, and the adjustment of minimum value $CW_{min}$ continues with the next measurement of successful transmission time $T_s$ (process 106).

For stationary conditions, minimum value $CW_{min}$ will eventually converge to a stable optimizing limit that maximizes successful transmission time $T_s$. In the trivial case of only one wireless network element, minimum value $CW_{min}$ will converge toward its lower limit (e.g., 1 in 802.11a and 802.11b systems, and 0 in 802.11e systems). More typically, however, BSS 10 will change over time, with network elements entering the coverage area and leaving the coverage area. The adjustment of minimum value $CW_{min}$ according to this embodiment of the invention readily handles these system changes, as it tracks the successful transmission time $T_s$ over time and adjusts minimum value $CW_{min}$ accordingly, as the networks change. The response of this adjustment to changing conditions can be adjusted by the step change factor $\lambda$, with larger steps improving convergence in changing conditions, versus smaller steps improving stability.

According to this embodiment of the invention, as in the previously described embodiment, the data throughput of the wireless network is also optimized, based on actual measured results over time. This second preferred embodiment of the invention provides the additional benefit of reducing the parameters that are to be measured; instead of measuring idle and collision times, according to this embodiment of the invention only the ultimate result of successful transmission times is measured.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of controlling network elements in a wireless network to schedule transmissions over a channel, comprising:

measuring a successful transmission time duration within a measurement period corresponding to the time during the measurement period during which successful transmissions occurred over the channel;

filtering the measured successful transmission time duration, by adjusting the measured successful transmission time duration with a value corresponding to a product of a forgetting factor with a difference in most recent measured successful transmission time durations;

adjusting a minimum value of an upper limit of a random number range responsive to the filtered measured successful transmission time duration;

broadcasting the adjusted minimum value of the limit of the random number range to at least one other network element in the wireless network, wherein the adjusted minimum value of the limit of the random number range controls the random number range from which the at least one other network element selects a random number that determines when the at least one other network element initiates a transmission over the channel after the end of a prior transmission over the channel; and repeating the measuring, adjusting, and broadcasting steps.

2. The method of claim 1, wherein the adjusting step comprises:

deriving a new minimum value of the limit of the random number range by modifying a prior minimum value of the limit of the random number range with a value corresponding to a product of a step length factor with a difference in most recent measured successful transmission time durations and with a difference in most recent minimum values of the limit of the random number range.

3. A method of controlling network elements in a wireless network to schedule transmissions over a channel, comprising:

measuring a transmission time duration within a measurement period, the transmission time duration indicating results of transmissions over the channel in the measurement period;

filtering the measured collision time duration, by adjusting the measured collision time duration with a value corresponding to a product of a forgetting factor with a difference in most recent measured collision time durations; and filtering the measured idle time duration, by adjusting the measured idle time duration with a value corresponding to a product of a forgetting factor with a difference in most recent measured idle time durations;

adjusting a minimum value of an upper limit of a random number range responsive to the filtered measured collision and idle time durations;

broadcasting the adjusted minimum value of the limit of the random number range to at least one other network element in the wireless network, wherein the adjusted minimum value of the limit of the random number range controls the random number range from which the at least one other network element selects a random number that determines when the at least one other network element initiates a transmission over the channel after the end of a prior transmission over the channel; and repeating the measuring, adjusting, and broadcasting steps.

4. The method of claim 3, wherein the adjusting step comprises:

deriving a new minimum value of the limit of the random number range by modifying a prior minimum value of the limit of the random number range with a value corresponding to a product of a step length factor with a difference between the measured collision time duration and the measured idle time duration.

5. The method of claim 1, wherein the measuring, adjusting, broadcasting, and repeating steps are performed by a wireless access point in the wireless network.

6. The method of claim 5, further comprising:

operating at least one network element in the network to transmit a frame over the channel, by performing a sequence of operations comprising:

preparing a frame for transmission over the channel;

probing the channel to determine whether it is busy or available;

responsive to the probing step determining that the channel is busy with a current frame, waiting for completion of an interframe space after the completion of the current frame;

receiving the broadcast adjusted minimum value of the limit of the random number range;

then selecting a pseudo-random value within the random number range having a limit at the adjusted minimum value of the limit of the random number range;

storing the selected pseudo-random value in a counter;

decrementing the counter until it reaches a terminal value; and responsive to the counter reaching a terminal value, initiating transmission of the prepared frame over the channel.

7. The method of claim 6, wherein
the adjusted minimum value of the limit of the random number range is an upper limit of the random number range;
the decrementing step counts the counter down toward a terminal value of zero;
and further comprising:
after the counting down step, probing the channel to determine whether it is busy or available;
responsive to the probing step determining that the channel is busy, increasing the upper limit of the random number range; and
then repeating the selecting, storing, and counting down steps.

8. The method of claim 7, further comprising:
responsive to the probing step determining that the channel is busy, and prior to the increasing step, comparing the upper limit of the random number range to a maximum value of the upper limit of the random number range; and
responsive to the comparing step indicating that the upper limit of the random number range is equal to the maximum value of the upper limit, then repeating the selecting, storing, and counting down steps without performing the increasing step.

9. The method of claim 8, further comprising:
responsive to receiving the adjusted minimum value of the limit of the random number range, adjusting the maximum value of the upper limit of the random number range responsive to the adjusted minimum value.

10. A wireless network element, comprising:
RF circuitry, for transmitting and receiving wireless signals;
media access control and physical layer circuitry, coupled to the RF circuitry, for processing signals to be transmitted by the RF circuitry as radio signals, and for processing radio signals received by the RF circuitry;
interface circuitry;
programmable logic, coupled to the media access control and physical layer circuitry, and to the interface circuitry, for executing program instructions; and
program memory, for storing program instructions to be executed by the programmable logic, including a sequence of program instructions for controlling the scheduling of transmissions over a wireless network channel, the sequence comprising the steps of:
measuring a successful transmission time duration within a measurement period, the successful transmission time duration corresponding to the time during the measurement period during which successful transmissions occurred over the channel;
filtering the measured successful transmission time duration, by adjusting the measured successful transmission time duration with a value corresponding to a product of a forgetting factor with a difference in most recent measured successful transmission time durations;
adjusting a minimum value of an upper limit of a random number range responsive to the filtered measured successful transmission time duration; filtered measured successful transmission time duration
broadcasting the adjusted minimum value of the limit of the random number range to at least one other network element in the wireless network, wherein the adjusted minimum value of the limit of the random number range controls the random number range from which the at least one other network element selects a random number that determines when the at least one other network element initiates a transmission over the channel after the end of a prior transmission over the channel; and
repeating the measuring, adjusting, and broadcasting steps wherein the broadcasting uses RF circuitry prior transmitting and receiving wireless signals.

11. The wireless network element of claim 10, wherein the adjusting step comprises:
deriving a new minimum value of the limit of the random number range by modifying a prior minimum value of the limit of the random number range with a value corresponding to a product of a step length factor with a difference in most recent measured successful transmission time durations and with a difference in most recent minimum values of the limit of the random number range.

12. The wireless network element of claim 10, wherein
the wireless network element is a wireless access point; and
the interface circuitry comprises a network transceiver, for communicating signals to and from a network backbone.

13. A method of controlling network elements in a wireless network to schedule transmissions over a channel, comprising:
measuring a transmission time duration within a measurement period, the transmission time duration indicating results of transmissions over the channel in the measurement period;
adjusting a minimum value of an upper limit of a random number range responsive to the measured transmission time duration;
broadcasting the adjusted minimum value of the limit of the random number range to at least one other network element in the wireless network, wherein the adjusted minimum value of the limit of the random number range controls the random number range from which the at least one other network element selects a random number that determines when the at least one other network element initiates a transmission over the channel after the end of a prior transmission over the channel;
repeating the measuring, adjusting, and broadcasting steps
operating at least one network element in the network to transmit a frame over the channel, by performing a sequence of operations comprising:
preparing a frame for transmission over the channel;
probing the channel to determine whether it is busy or available;
responsive to the probing step determining that the channel is busy with a current frame, waiting for completion of an interframe space after the completion of the current frame;
receiving the broadcast adjusted minimum value of the limit of the random number range;
then selecting a pseudo-random value within the random number range having a limit at the adjusted minimum value of the limit of the random number range;
storing the selected pseudo-random value in a counter;
decrementing the counter until it reaches a terminal value; and responsive to the counter reaching a terminal value, initiating transmission of the prepared frame over the channel;

responsive to the probing step determining that the channel is busy, comparing the upper limit of the random number range to a maximum value of the upper limit of the random number range increasing the upper limit of the random number range; and responsive to the comparing step indicating that the upper limit of the random number range is equal to the maximum value of the upper limit, then repeating the selecting, storing, and counting down steps without performing the increasing step.

* * * * *